United States Patent [19]

Bunch, Jr. et al.

[11] Patent Number: 5,000,043

[45] Date of Patent: Mar. 19, 1991

[54] APPARATUS AND METHOD FOR TESTING FUEL INJECTORS

[75] Inventors: Robert L. Bunch, Jr., Peoria; Harvey G. Dillard, Princeville, both of Ill.

[73] Assignee: Caterpillar Inc., Peoria, Ill.

[21] Appl. No.: 345,860

[22] Filed: May 1, 1989

[51] Int. Cl.[5] .............................................. G01M 19/00

[52] U.S. Cl. .................................................... 73/119 A

[58] Field of Search ................ 73/119 A, 113; 239/74

[56] References Cited

U.S. PATENT DOCUMENTS

| | | | |
|---|---|---|---|
| 3,478,580 | 11/1969 | Siemietkowski et al. | 73/119 A |
| 4,573,349 | 3/1986 | Slindee | 73/119 A |
| 4,845,979 | 7/1989 | Farenden et al. | 73/119 A |

FOREIGN PATENT DOCUMENTS

| | | | |
|---|---|---|---|
| 474473 | 9/1952 | Italy | 73/119 A |
| 1300184 | 3/1987 | U.S.S.R. | 73/119 A |
| 926578 | 5/1963 | United Kingdom | 73/119 A |
| 967910 | 8/1964 | United Kingdom | 73/119 A |

*Primary Examiner*—Robert Raevis
*Attorney, Agent, or Firm*—Sterling R. Booth, Jr.

[57] ABSTRACT

Conventional apparatus for testing fuel injectors are inconvenient, difficult to adapt to different injectors and are quite expensive. The subject apparatus overcomes these problems by providing a testing apparatus which has a fuel manifold with internal passages to an interchangeable adaptor. The interchangeable adapter provides for different sizes of fuel injectors and changes in access to their fuel ports. The apparatus includes visual inspection means that can readily changed to a measuring means for measuring the fuel being injected as well as to continuously observe the injection spray. The entire apparatus is self-contained in a manner that reduces external leakage of fuel during testing and is under control of an electronic controller that simulates engine operation of a fuel injector.

11 Claims, 7 Drawing Sheets

APPARATUS AND METHOD FOR TESTING FUEL INJECTORS

DESCRIPTION

1. Technical Field

This invention relates to an apparatus and method for testing the efficacy of fuel injectors.

2. Background

The assignee of this application has recently developed an electronically controlled hydraulic unit fuel injector that can be readily adapted to different diesel engines without extensive redesign. The unit injector has a control valve and an injection nozzle, the combination of which has required the development of new testing equipment.

Testing equipment which exists today and has been extensively used prior to this invention is extremely expensive and requires elaborate set-ups in laboratories and the like. Such equipment requires an extensive changeover when changing from one valve to another of various sizes or from different tests of the injector.

With the advent of the new injector, it will be necessary to provide testing equipment at the service garages located throughout the country which normally cannot economically afford the elaborate test equipment described above. Also, such equipment was difficult to operate, requiring skilled technicians to conduct the test.

Without such test equipment located at the service garage level, it would be impossible to check a valve or a nozzle for efficacy in order to make a determination as to whether it was causing a particular engine problem. In the past, it has been the general practice to replace the full injector or valve whether it was bad or not in an effort to eliminate a particular engine problem. As a result, extensive warranty costs were experienced by the manufacturer and many good injectors were scrapped.

The present invention is directed to overcoming the problems as set forth above with an apparatus and method that is far more economical, accurate, and user friendly resulting in more dependable service results.

DISCLOSURE OF THE INVENTION

In one aspect of the invention, an apparatus is provided for testing the efficacy of a fuel injector having a fuel injection valve and a nozzle with at least one orifice for injecting fuel therethrough. The apparatus includes a manifold having fluid passages and mounting means for receiving the fuel injector to be tested for holding the fuel injector in fluid communication with the fluid passages and the nozzle so it depends from the manifold and means for supplying a testing fluid under pressure to the manifold fluid passages. A support is disposed below the mounting means having a drain port therein and means selectively mounted thereon to releasably support a visual inspection means extending upwardly therefrom circumjacent the nozzle for providing visual inspection of the nozzle during a first phase of the test, the means having an opening at the bottom thereof for communication with the drain port. A closed bottom container is selectively mountable on the base and extending upwardly therefrom circumjacent the nozzle in lieu of the visual inspection means in another test phase. A quick change means is associated with the support for selectively holding one of the visual inspection means or the container on the support during the testing of the fuel injector and is so constructed and arranged as to allow quick changeover from the first phase of the test to the other. Control means is also provided for controlling the supply means and the fuel injection valve during the several phases of the testing.

In a further aspect of the invention, the support includes a reservoir for containing the test fluid, the reservoir providing a base for the apparatus. A housing is mounted on the base and the fluid manifold is mounted on the housing. The housing has a generally open chamber, open to the reservoir providing a return passage for the fluid from the manifold to the reservoir.

In a further aspect of the invention, a heat exchanger is provided in the open chamber of the housing to cool the test fluid as it is returning to the reservoir from the fluid manifold.

In a still further aspect of the invention, the quick change means has a hollow sleeve extending into the drain port in the support and resilient means extending between a flange on one end of the sleeve and the support. The resilient means forces the sleeve against the visual inspection means and the measuring means which can be interchanged by pushing the sleeve into the drain port against the resilient means interchanging the visual inspection means and the measuring means without tools.

In a further aspect of the invention, the control means comprises a control panel, an electronic controller that simulates an engine control, a power supply for the controller and a driver controlled by the electronic controller whereby the fuel injection valve is operated as though it were in the engine.

In a further aspect of the invention, a strobe lamp may be used in conjunction with the test apparatus for producing an intermittent beam of light under control of the electronic control. The light beam is directed towards the nozzle in the visual inspection means and the intermittent light beam coincides with the injection of fuel from the nozzle.

In a further aspect of the invention, a method for testing the efficacy of a fuel injector having a fuel injection valve and a nozzle with at least one orifice therethrough for inspection of fuel is provided. The steps of the method include mounting the fuel injector through a mounting means extending through a fluid manifold, the manifold having fluid passages communicating with the fuel injection valve. Pumping test fluid from a reservoir with a pump into the passages in the fluid manifold and controlling the test fluid pressure with adjustable pressure relief valves. Spraying fuel from the nozzle extending below the fluid manifold into visual inspection means extending between a mounting means and the manifold to a support disposed below the mounting means. Observing the spray pattern through the visual inspection means. Removing the visual inspection means from a quick change means associated with the support. Inserting a measuring means in lieu of the removed visual inspection means. Controlling the fuel inspection valve with a control means simulating various engine conditions.

The foregoing and other aspects will become apparent from the following description when considered in junction with the accompanying drawings. It is especially understood that the drawings are not intended as a definition of the invention but for the purpose of illustration only.

BEST MODE FOR CARRYING OUT THE INVENTION

Figure 1:
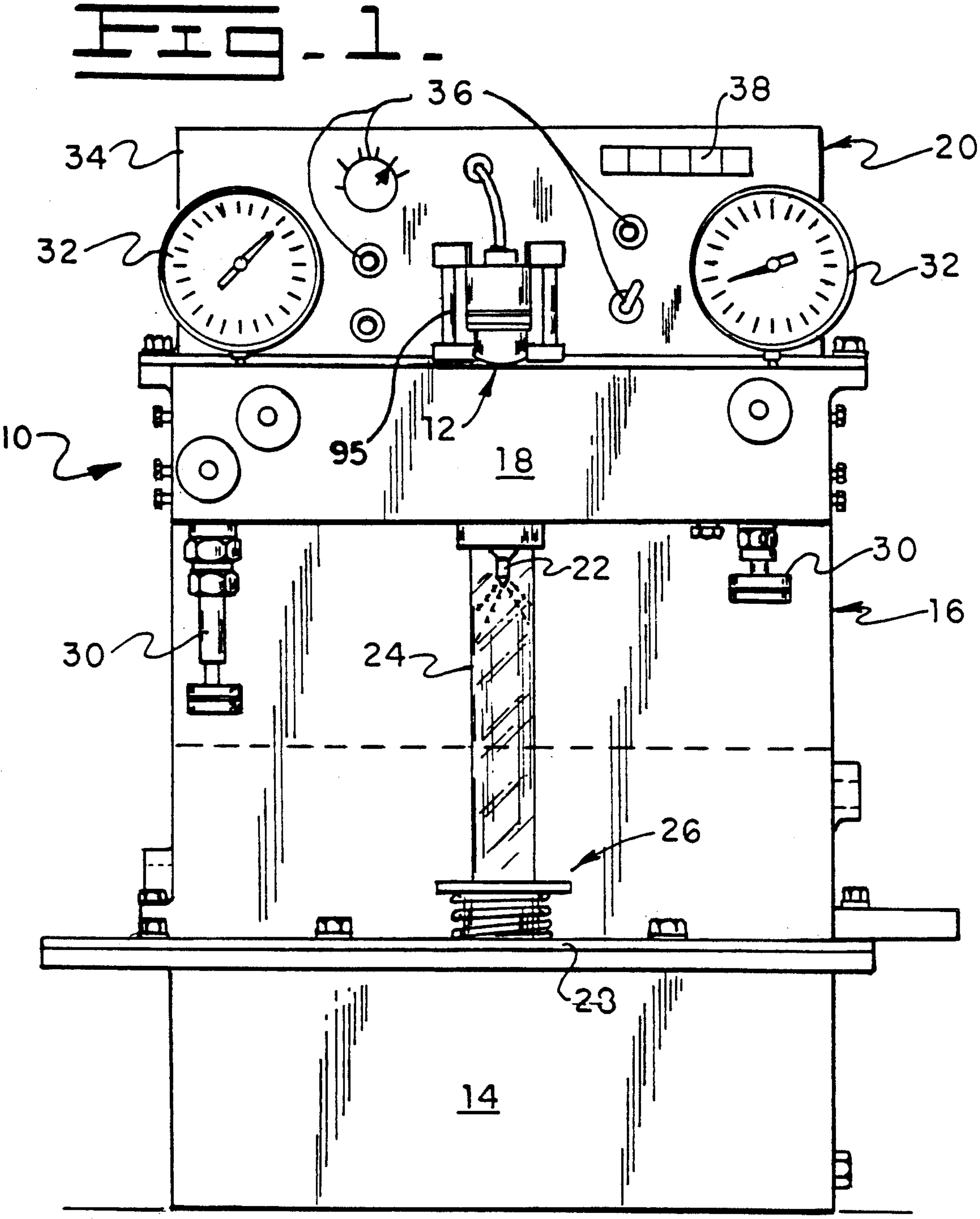
FIG. 1 is a front elevational view of the apparatus with an injector shown in place in the manifold and the visual inspection means installed.
Figure 2:
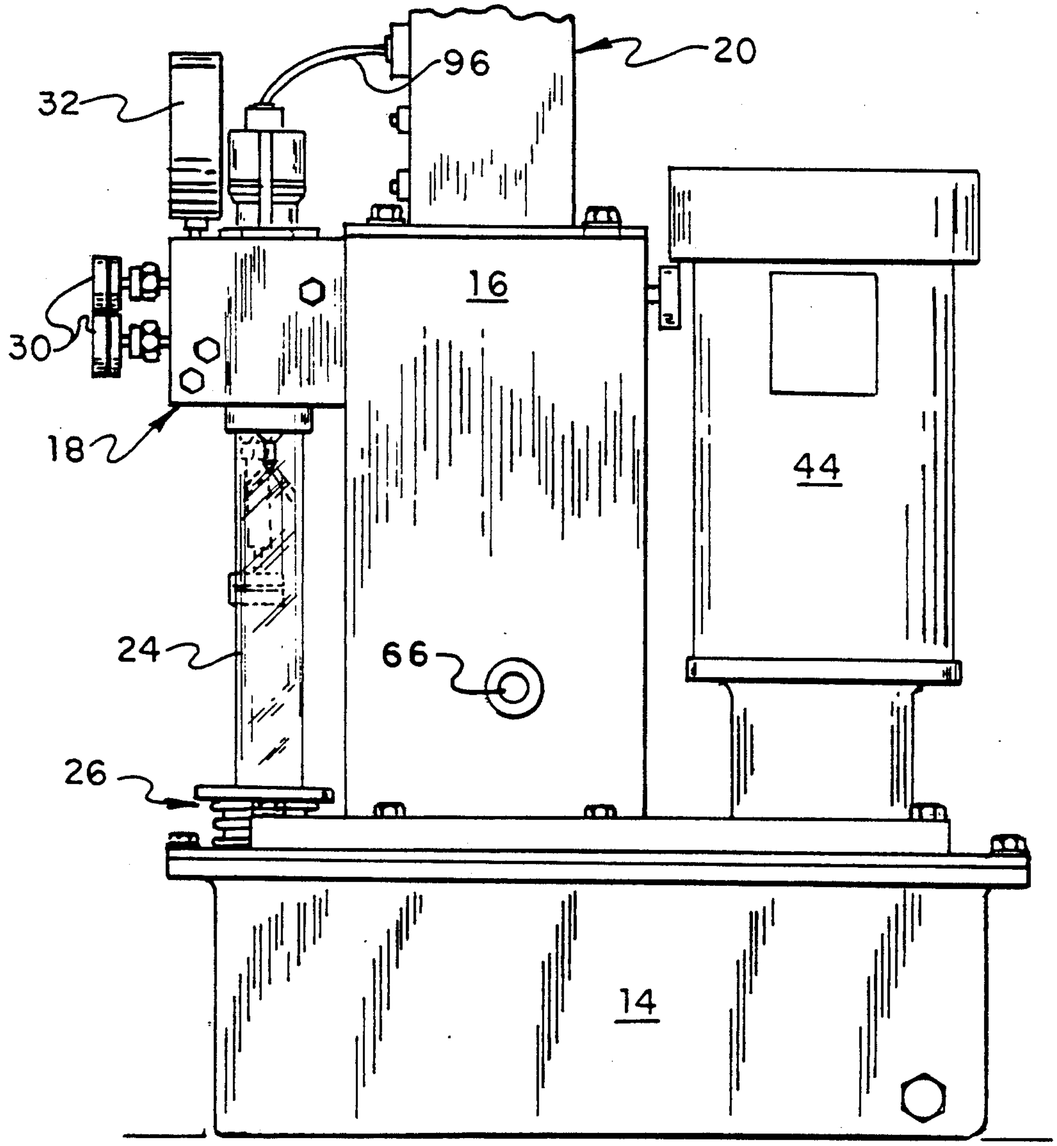
FIG. 2 is a side elevational view of the apparatus.

In FIG. 1 an apparatus 10 is shown for testing a fuel injector 12. The apparatus includes a base 14 with a housing 16 mounted thereto. At the top of the housing 16 there is attached a fluid manifold 18. A means 20 for controlling a fuel injector test is attached to the top of the housing 16 which as shown in later figures also provides the top for the housing 16.

A nozzle 22 which is a part of the fuel injector 12 extends below the manifold 18 into a visual inspection means 24. The visual inspection means 24 extends from below the manifold 18 to a quick change means 26 that extends into a support 28 of the base 14.

Pressure relief valves 30 in the fluid manifold 18, which also has pressure gauges 32, establish and adjust the pressure for the fuel injector test.

The means for controlling the test includes a control panel 34 which has appropriate dials and switches 36 for controlling the test. A part of this control panel includes a digital read-out counter means 38.

Figure 3:
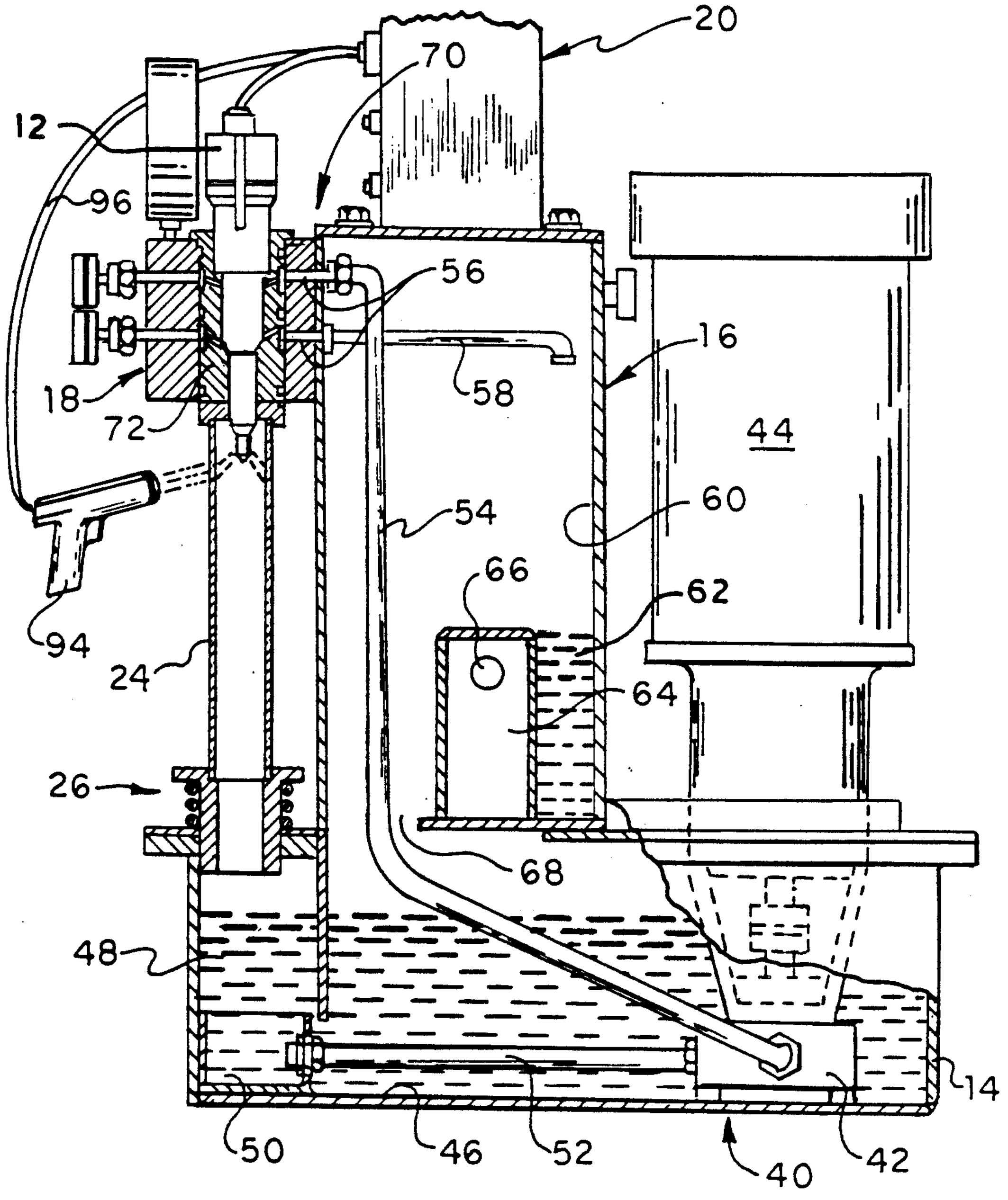
FIG. 3 is a cross-sectional view of the apparatus.
Figure 4:
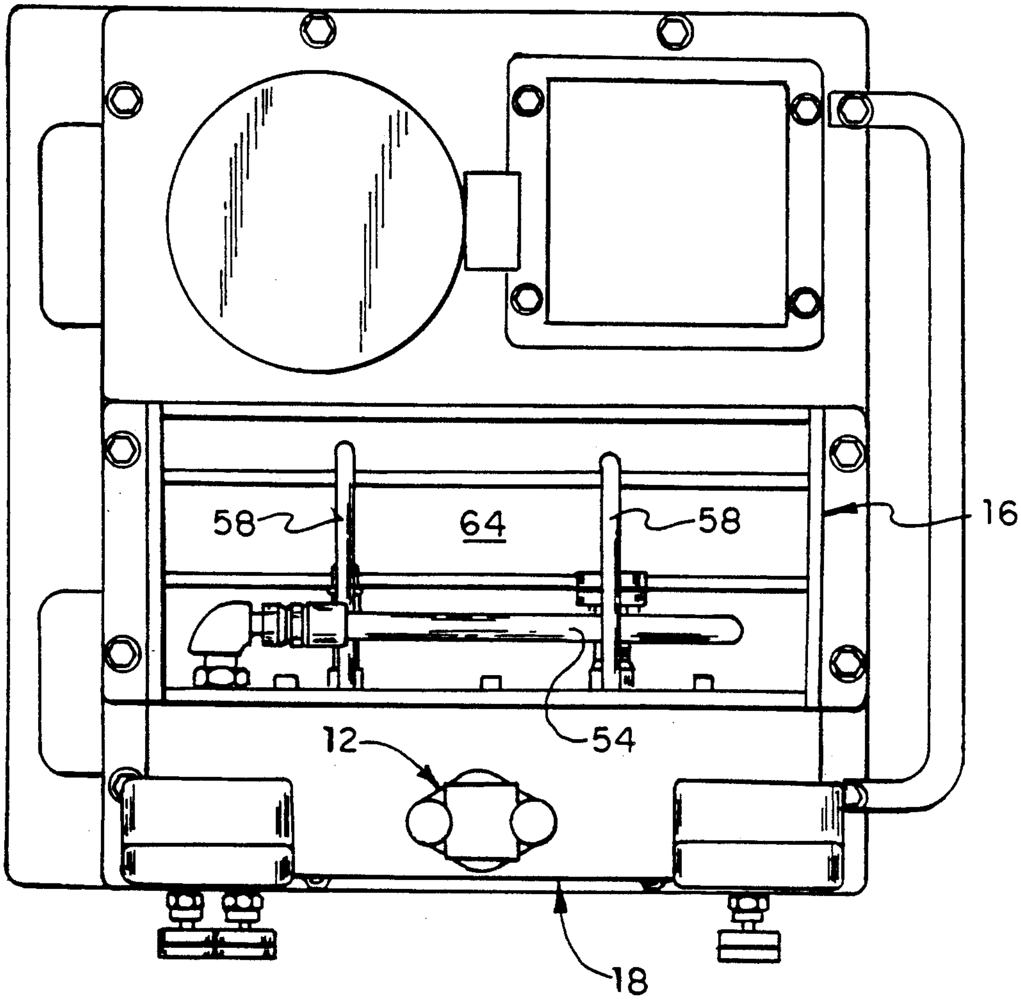
FIG. 4 is a top view of the apparatus with the controller removed.

A means 40 for supplying the testing fluid can be more readily seen in FIG. 3. The means for supplying the testing fluid includes a pump 42 driven by an electric motor 44. The pump and motor are mounted on the base 14 with the pump extending into a reservoir 46, a part of the base 14, containing the testing fluid 48. A pump inlet sump 50 is connected to the pump 42 by a tube 52. An outlet of the pump 42 is attached to a tube 54 extending from the pump outlet to fluid passages 56 of the fuel manifold 18.

Fluid return means 58 carries the fluid bypassing the relief valves back into a chamber 60 of the housing 16. The return fluid flows downwardly to a trap-like area 62. The trap 62 is formed by a heat exchanger 64 which extends from one wall of the chamber 60 to the other within housing 16. Cooling fluid is introduced into the heat exchanger by ports 66.

A return passage 68 located at the lower end of the chamber 60 provides access into the reservoir 46 of base 14.

The manifold 18 is mounted near the top or upper portion of the housing 16. In this manner its fluid passages which carry the test fluid to the injector 12 as it is being tested has easy access to the fluid supply means 40 which is carried inside of the reservoir 46 of the base 14 and the chamber 60 of the housing 16. In this manner any fuel or test fluid that may be leaking is contained within the housing itself, reducing any external leakage.

Figure 7:
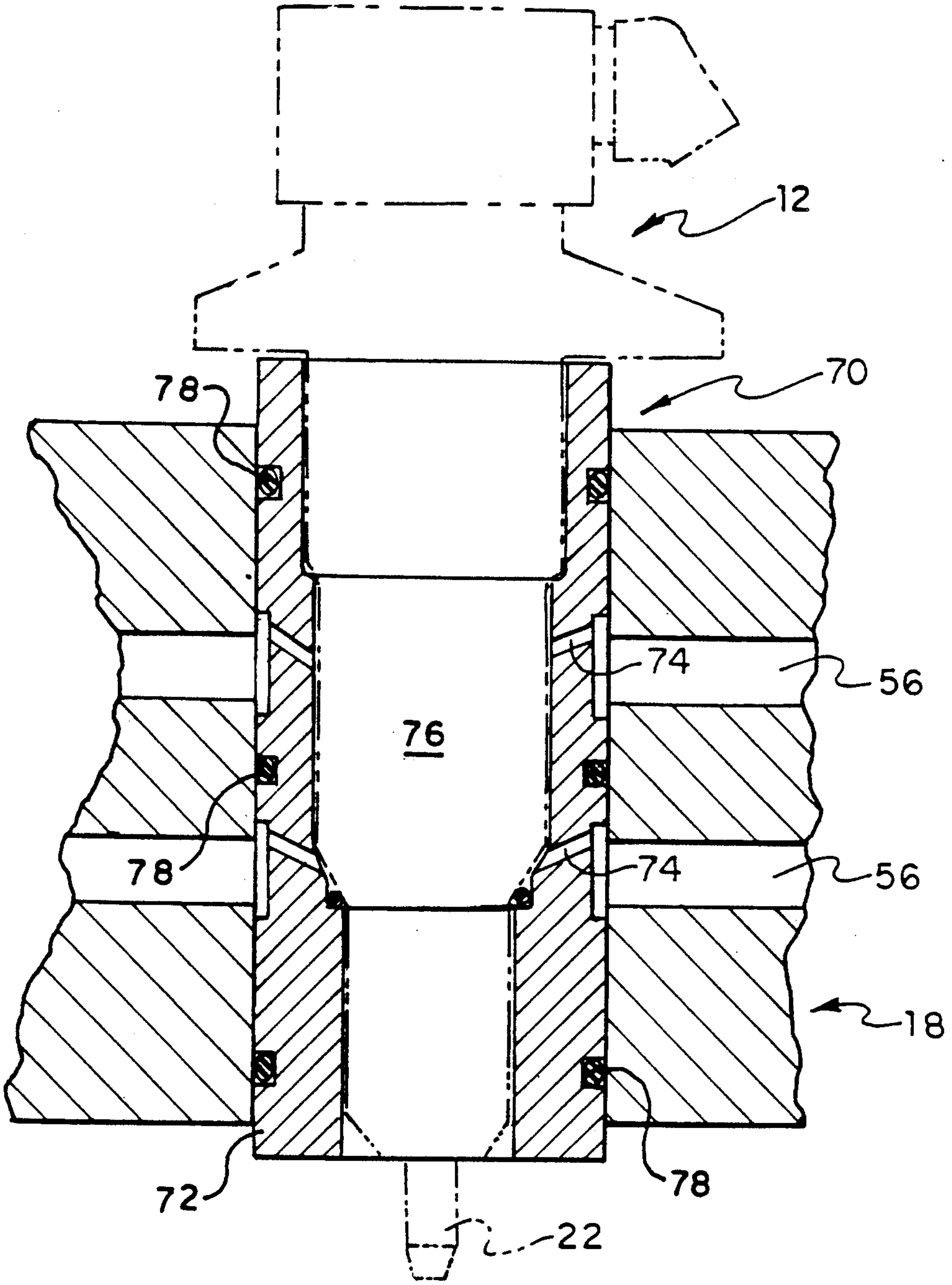
FIG. 7 is an enlarged cross-sectional view taken through the manifold showing the adaptor of the mounting means with the fuel injector shown in phantom.

Near the center of the fluid manifold 18 a mounting means 70 is provided for mounting the fuel injector 12 for the efficacy test. The mounting means 70 which is shown more clearly in FIG. 7, by the enlarged view, includes an interchangeable adaptor 72. The adaptor 72 has appropriate passages 74 that provides the access of the test fluid between passages 56 of the fluid manifold 18 and the access passages of the injector valve 76 of the injector 12. The interchangeable adaptor 72 has appropriate sealing means 78 to isolate the different fluid passages from each other as well as preventing fuel leakage externally of the testing apparatus.

The visual inspection means 24, which is a tube of transparent material such as glass or a clear plastic, is held in place by the quick change means 26 as described previously. The quick change means 26, which is more clearly shown in the enlarged views of FIG. 5 and FIG. 6, has a hollow sleeve 75 extending through a drain port 77. The drain port 77 is in the support 28 which is at the top of the base 14. The hollow sleeve 75 has a flange 78 at its upper end with a slight recess 80 surrounding a passage 82 of the hollow sleeve 75. A resilient means 84 surrounds the hollow sleeve 75 and extends between the flange 78 and the upper surface of the support 28. A coiled compression spring 85 is shown in this particular modification; however, other resilient means could be used.

Figure 5:
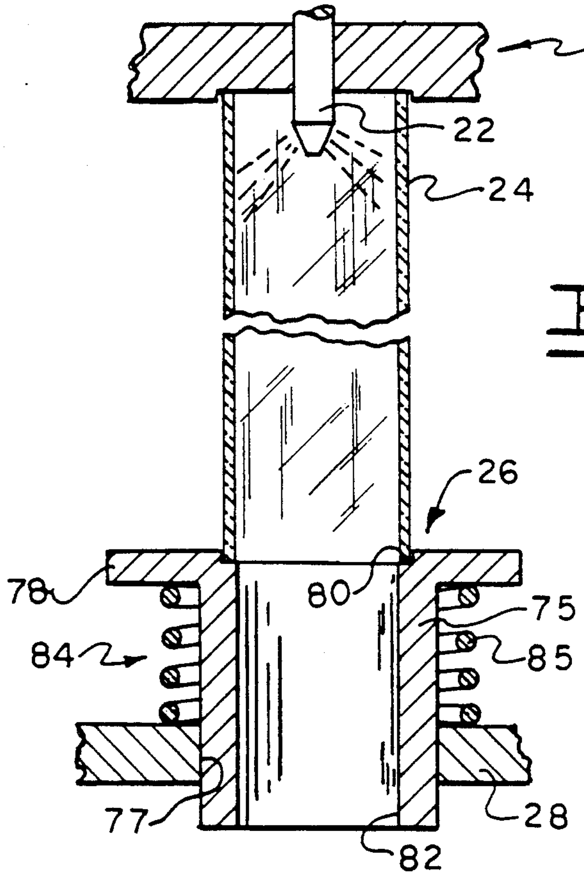
FIG. 5 is an enlarged cross-sectional view taken through the visual inspection means and quick change device.
Figure 6:
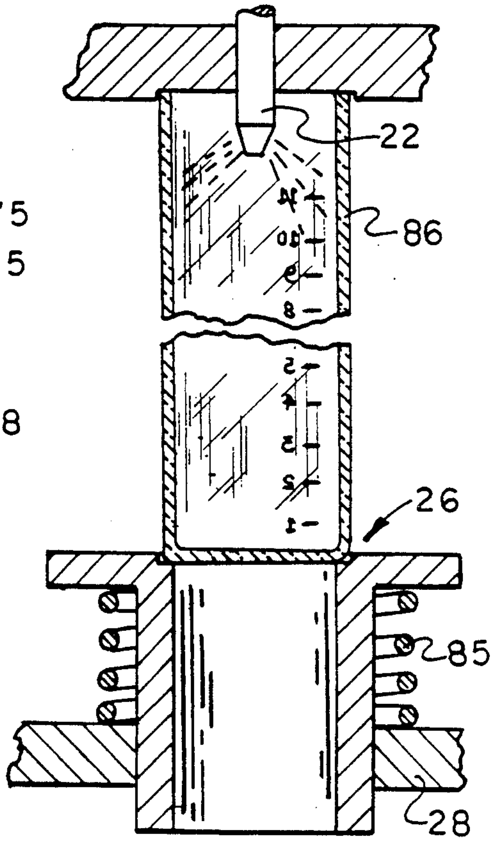
FIG. 6 is an enlarged cross-sectional view of the quick change device with the container in place.

As can be seen from the FIG. 5 view the visual inspection means 24 sets in the recess 80 of the hollow sleeve 75 and is held against the lower portion of the fluid manifold means 18 by the resilient means 84. In FIG. 6 the visual inspection means has been removed and replaced with a measuring means 86 which is in this case a transparent beaker-like container.

Figure 8:
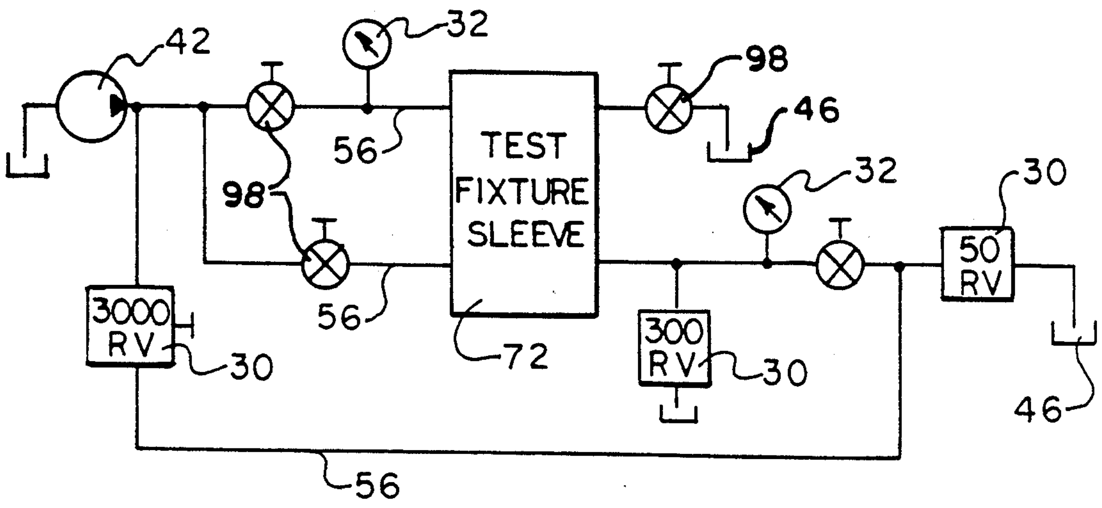
FIG. 8 is a schematic drawing of the fluid circuit.

The fluid circuit for the test apparatus is shown by the schematic of FIG. 8. The schematic shows the interconnecting relationship of the test fluid 10 supply means 42 with the passages 56 of the manifold 18 and test fixture adapter 72. Valves 98 provide means to direct and control the flow of the test fluid to the appropriate passage in the injector valve for testing different aspects of the injector.

Figure 9:
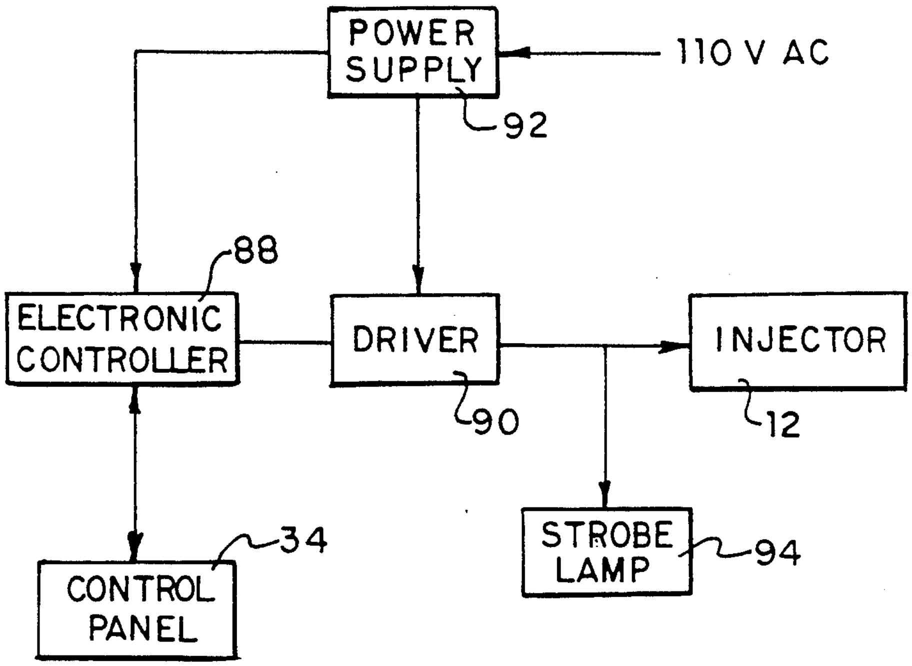
FIG. 9 a schematic drawing of the control circuit.

In FIG. 9 the control circuit for the injector and a strobe lamp 94 is shown. An electronic controller 88 under the control of the control panel 34 sends signals to a driver 90. The electronic controller and driver are provided with electrical power from a power supply 92. The driver 90 produces the appropriate signal to control the injector 12 and the strobe lamp 94.

Industrial Applicability

The above described apparatus is used to test the efficacy of a fuel injector valve and its appending nozzle. As set forth in the background various operating aspects of the nozzle must be checked to determine if the injector is functioning according to factory specifications.

To begin the test the appropriate adaptor 72 is selected that will provide the proper mounting means 70 for a particular fuel injector, and it is inserted into the fluid manifold means 18. The fuel injector is then inserted into the adaptor and is secured in place by locking means 95. The injector is then electronically connected to the control means by an electrical lead 96.

The apparatus is powered up by a switch on the control panel. This causes the electric motor 44 to power the pump 42 providing fuel under pressure to the manifold 18. The pressure desired for the particular test conducted is then set by the adjustable pressure relief valves 30. Such pressure is measured by the gauges 32.

The operator then begins the testing cycle by selecting the appropriate test on the control panel which sends a signal to the electronic controller 88. The electronic controller produces a signal or command to the driver 90 which powers the solenoid or actuating means of the fuel injector. The fuel injector then begins the fuel injection cycle as though it were in an engine. This causes intermittent fuel injections through the nozzle which is now visible through the visual inspection means, allowing the operator to determine if the nozzle is performing satisfactorily.

The fuel from the injections is drained downwardly through the visual inspection means through the passage 82 of the hollow sleeve 75 where it is returned to the reservoir 46.

The fluid that is being bypassed by the pressure relief valves is returned via the fluid passages within the manifold means through a fluid return means 58 where it falls into the trap 62. As the trap 62 fills the fluid passes over the heat exchanger which receives cooling fluid through a port 66. As the fuel passes over the heat exchanger, it is cooled and returned to the reservoir 46 through the return passage 68.

After the visual inspection of the nozzle is completed, the quick change means is pushed downwardly against the resilient means releasing the visual inspection means from the recess 80. The visual inspection means is then removed and is replaced with measuring means 86. The test is then continued and the amount of fuel that is being injected is measured to determine if the injector is injecting the proper amount of fuel for the number of cycles that are counted by the controller.

During the inspection, the strobe lamp 94 is held by the operator such that the beam of light being emitted from the lamp is directed toward the fuel nozzle of the injector in the visual inspection means. The strobe lamp being controlled by the same output from the driver as the injector provides an intermittent beam of light that coincides with the fuel injection thereby making the fuel injection more easily seen since it visually stops the action.

Other aspects, objects and advantages become apparent from study of the specification drawings and appendant claims.

We claim:

1. A system for testing the efficacy of a fuel injector having a fuel injection valve and a nozzle with at least one orifice for injecting fuel therethrough, comprising:
- a fluid manifold having fluid passages therein, and having mounting means for receiving a fuel injector to be tested and for holding the fuel injector in fluid communication with said fluid passages and with the nozzle depending from the manifold;
- means for supplying a testing fluid under pressure to the manifold fluid passages;
- a support disposed below the nozzle and having a drain port therein;
- means selectively mountable on the support in a first test phase and extending upwardly therefrom circumjacent the nozzle for providing visual inspection of the nozzle, said means having an opening at the bottom thereof for communication with the drain port;
- a measuring means selectively mountable on the support and extending upwardly therefrom circumjacent the nozzle in lieu of the visual inspection means in another test phase, said measuring means being closed at the bottom thereof;
- quick change means comprising a hollow sleeve extending into the drain port in the support and resilient means extending between a flange on one end of the sleeve and the support, the resilient means holding the sleeve against either the visual inspection means or the measuring means to force either the visual inspection means or the measuring means against a lower portion of the fluid manifold, whereby said visual inspection means and measuring means can be readily interchanged by pushing the sleeve into the drain port against the resilient means wherein the visual inspection means and the measuring means can be interchanged without tools from the first phase of the test to the other; and
- means for controlling the supply means and the fuel injection valve during the phases of the test.

2. The system, as set forth in claim 1, wherein the support includes a reservoir for containing the test fluid, the reservoir providing a base for the system.

3. The system, as set forth in claim 2, wherein the fluid manifold is mounted on a housing mounted on the base, the housing having a chamber that is generally open to the reservoir providing a return passage from the fluid manifold to the reservoir.

4. The system, as set forth in claim 3, including a heat exchanger extending from one wall of the housing to an opposite wall of the housing and forming a trap-like area in the open chamber of the housing to trap fluid from a fluid return means causing it to flow over the heat exchanger to cool the test fluid as it is returning to the reservoir from the fluid manifold.

5. The system, as set forth in claim 2, wherein the means for supplying the testing fluid includes a pump mounted in the reservoir and a tube connecting the pump to the fluid passages in the fluid manifold.

6. The system, as set forth in claim 1, including at least one adjustable pressure relief valve in the fluid manifold for adjusting the fluid pressure to the fuel injection valve.

7. The system, as set forth in claim 6, including at least one pressure gauge in fluid communication with the passages in the fluid manifold for measuring the fluid pressure.

8. The system, as set forth in claim 1, wherein the mounting means includes interchangeable adapters having various internal diameter dimensions for accommodating different size fuel injectors.

9. The system, as set forth in claim 1, wherein the visual inspection means is comprised of a clear transparent tube.

10. The system, as set forth in claim 1, wherein the means for controlling the fuel supply means and the injector comprises:
- a control panel;
- an electronic controller controlled by the control panel and simulating an engine control;
- a power supply for the controller; and
- a driver controlled by the electronic controller for powering a solenoid of the injector being tested, whereby the fuel injection valve is operated as though it were in an engine.

11. The system as set forth in claim 10, including a strobe lamp for producing an intermittent beam of light under control of the electronic controller whereby as the beam of light is directed toward the nozzle in the visual injection means the intermittent light beam coincides with the injection of fuel from the nozzle whereby the fuel injection can be more easily seen since the beam of light visually stops the action.

* * * * *